(12) United States Patent
Minami et al.

(10) Patent No.: US 6,310,702 B1
(45) Date of Patent: Oct. 30, 2001

(54) TESTING DEVICE FOR MULTISTAGE MULTI-BRANCH OPTICAL NETWORK

(75) Inventors: Takao Minami; Nobuaki Takeuchi, both of Tokyo; Naoyuki Nozaki, Osaka; Koichi Shinozaki, Osaka; Takamu Genji, Osaka, all of (JP)

(73) Assignees: Ando Electric Co., Ltd., Tokyo; Kansai Electric Power Co., Inc., Osaka, both of (JP)

( * ) Notice: Subject to any disclaimer, the term of this patent is extended or adjusted under 35 U.S.C. 154(b) by 0 days.

(21) Appl. No.: 09/099,502

(22) Filed: Jun. 18, 1998

(30) Foreign Application Priority Data

Jun. 18, 1997 (JP) .................................................. 9-161396

(51) Int. Cl.$^7$ .................................................. H04B 10/08

(52) U.S. Cl. .................... 359/110; 359/177; 359/176; 359/187; 359/169; 359/170; 359/118; 356/73

(58) Field of Search ..................... 359/110, 177, 359/176, 187, 169, 170, 118; 356/73

(56) References Cited

U.S. PATENT DOCUMENTS

| | | | | |
|---|---|---|---|---|
| 5,383,015 | * | 1/1995 | Grimes | 356/73.1 |
| 5,396,569 | * | 3/1995 | Yanagawa et al. | 385/24 |
| 5,491,573 | * | 2/1996 | Shipley | 359/156 |
| 5,491,574 | * | 2/1996 | Shipley | 359/156 |
| 6,028,661 | * | 2/2000 | Minami et al. | 356/73.1 |

FOREIGN PATENT DOCUMENTS

| | | |
|---|---|---|
| 197 01 908 A1 | 8/1997 | (DE) . |
| 0447439 | * 9/1991 | (EP) . |
| WO 90/06498 | 6/1990 | (WO) . |

OTHER PUBLICATIONS

Hettich, Armin, "RuckstreumeBgerat OMB", ANT Nachrichtentechnische Berichte Heft, Dec. 3, 1986, pp. 273–278.
"Electronics Letters", Apr. 12, 1984, vol. 20, No. 8, pp. 338–340.
F. Yamamoto et al., "1.6μm–band Fault Isolation Technique for Passive Double Star Networks", IEICE of Japan, Paper B–846, p. 444, (1994).

* cited by examiner

*Primary Examiner*—Jason Chan
*Assistant Examiner*—Chau M. Nguyen
(74) *Attorney, Agent, or Firm*—Fish & Richardson P.C.

(57) ABSTRACT

A testing device performs testing on a multistage multi-branch optical network, which contains optical lines (such as optical fibers) that are connected together at connection points (e.g., optical couplers) in a multistage multi-branch manner. An OTDR measurement device uses software to perform fault determination with respect to the multistage multi-branch optical network. Herein, optical pulses are input to an input end of the multistage multi-branch optical network, wherein they are reflected at certain portions of the optical lines and the connection points while propagating through the optical lines. Then, reflected beams are returned to the input end and are mixed together as response light, which is measured by the OTDR measurement device. The response light is converted to a plurality of digital waveform data representing a measured waveform, which is then divided into multiple ranges on the basis of the Fresnel reflection points and connection points. Separative analysis is performed on the digital waveform data belonging to each of the ranges of the measured waveform. The separative analysis is repeated at measuring times, which are determined in advance. So, the fault determination is made by comparing results of the separative analysis, which are obtained at the measuring times respectively. By the fault determination, it is possible to determine a fault line and a fault location (or fault distance) as well as a fault time.

7 Claims, 7 Drawing Sheets

FIG.4

| BEFORE OCCURRENCE OF FAULT | | DETERMINATION BASIS |
|---|---|---|
| RANGE | ATTENUATION CONSTANT | |
| EC2-ED3 | C2 | TERMINAL POINT OF C2:EC2 |
| ED3-ED2 | C2+D3 | TERMINAL POINT OF D3:ED3 |
| ED2-ED1 | C2+D2,D3 | TERMINAL POINT OF D2:ED2 |
| ED1-CP3 | C2+D1,D2,D3 | TERMINAL POINT OF D1:ED1 |
| CP3-EC1 | C2+B1 | START POINT OF D1,D2,D3:CP3<br>TERMINAL POINT OF B1:CP3 |
| EC1-CP2 | C1,C2+B1 | TERMINAL POINT OF C1:EC1 |
| CP2-CP1 | B1,B2 | START POINT OF C1,C2:CP2<br>TERMINAL POINT OF B2:CP2 |
| CP1-S | A | START POINT OF B1,B2:CP1<br>TERMINAL POINT OF A:CP1 |

FIG.6

| AFTER OCCURRENCE OF FAULT | | DETERMINATION BASIS |
|---|---|---|
| RANGE | ATTENUATION CONSTANT | |
| EC2-ED3 | C2 | TERMINAL POINT OF C2:EC2 |
| ED3-ED1 | C2+D3 | TERMINAL POINT OF D3:ED3 |
| ED1-ED2' | C2+D1,D3 | TERMINAL POINT OF D1:ED1 |
| ED2'-CP3 | C2+D1,D2,D3 | TERMINAL POINT OF D2:ED2' |
| CP3-EC1 | C2+B1 | START POINT OF D1,D2,D3:CP3<br>TERMINAL POINT OF B1:CP3 |
| EC1-CP2 | C1,C2+B1 | TERMINAL POINT OF C1:EC1 |
| CP2-CP1 | B1,B2 | START POINT OF C1,C2:CP2<br>TERMINAL POINT OF B2:CP2 |
| CP1-S | A | START POINT OF B1,B2:CP1<br>TERMINAL POINT OF A:CP1 |

TESTING DEVICE FOR MULTISTAGE MULTI-BRANCH OPTICAL NETWORK

BACKGROUND OF THE INVENTION

1. Field of the Invention

This invention relates to testing devices that perform testing on multistage multi-branch optical networks with respect to fault time, fault line and fault distance. This application is based on patent application No. Hei 9-161396 filed in Japan, the content of which is incorporated herein by reference.

2. Description of the Related Art

FIG. 7 shows an example of a testing device for a multi-branch optical network. This testing device performs fault isolation test on an optical network of 8-branch type provided in 1.31/1.55 µm wavelength multiplex transmission system. In FIG. 7, an OTDR measurement device 1 (where "OTDR" is an abbreviation for "Optical Time Domain Reflectometer") generates test light (having 1.6 µm band), which is incoming to an optical line 3 via a coupler 2. Then, the test light is subjected to branching by a star coupler 4, from which test beams are distributed to "branch" optical fibers whose numbers range from No. 1 to No. 8. Herein, filters 41 to 48 are respectively provided on the optical fibers No. 1 to No. 8 prior to their ONUs (where "ONU" is an abbreviation for "Optical Network Unit", which is an optical subscriber network unit). Each of the filters 41 to 48 has a specific band-pass characteristic that passes only a light signal corresponding to each of the ONUs while reflecting the test beam. Therefore, each of the test beams that progress through the optical fibers No. 1 to No. 8 respectively is reflected by each of the filters 41 to 48. Thus, a reflection beam given from each filter is transmitted backwardly on each optical fiber. Reflection beams, transmitted backwardly on the optical fibers No. 1 to No. 8, are subjected to wave mixing by the star coupler 4. As a result, mixed light is transmitted via the coupler 2 to the OTDR measurement device 1 as response light. So, the OTDR measurement device 1 performs analysis of the response light.

FIG. 8 shows an example of a waveform of the response light, which is supplied to the OTDR measurement device 1. This waveform corresponds to a time-series record of the waveform of the response light, which is supplied to the OTDR measurement device 1 via the coupler 2. In FIG. 8, a horizontal axis is given by multiplying a time axis by a transmission speed of the response light. That is, the horizontal axis of FIG. 8 represents a length of the optical fiber through which the response light propagates. So, the waveform of the response light is plotted in accordance with such a horizontal axis. By the way, the reponse light corresponds to a result of wave mixing of the reflection beams reflected by the filters 41 to 48 respectively. These filters are located at different positions on the optical fibers, in other words, these filters are located with different distances from the OTDR measurement device 1. For this reason, the reflection beams from the filters 41 to 48, which are measured by the OTDR measurement device 1, are not overlapped with each other on the time axis. So, they are measured as separate ones. A leftmost wave portion "R" of the waveform shown in FIG. 8 represents a reflection beam given from the star coupler 4. In FIG. 8, eight wave portions, which follow the leftmost wave portion R, are arranged from the left to the right. The eight wave portions correspond to eight reflection beams, which are transmitted backwardly on the optical fibers No. 1 to No. 8 respectively and are supplied to the OTDR measurement device 1.

FIG. 9A and FIG. 9B each show a set of three wave portions corresponding to reflection beams of the optical fibers No. 6 to No. 8, which are extracted from reflection beams measured by the OTDR measurement device 1. Herein, the three wave portions are magnified in scale. FIG. 9A shows an example of the three wave portions with respect to the case where fault occurs on none of the optical fibers, while FIG. 9B shows another example of the three wave portions with respect to the fault-simulated case where a bending loss of 3 dB is intentionally imparted to the optical fiber No. 7. It can be observed from FIG. 9A and FIG. 9B that intensity of the reflection beam is lowered due to occurrence of the simulated fault.

Thus, the testing device of FIG. 7 is capable of performing fault detection with respect to fault that occurs on the optical fiber by analyzing the intensity of each of the reflection beams included in the response light supplied to the OTDR measurement device 1. Incidentally, such a technology is disclosed by the paper B-846 entitled "1.6 µm-band Fault Isolation Technique for Passive Double Star Networks", which is issued in 1994 autumn meeting of the Institute of Electronics, Information and Communication Engineers of Japan, for example.

The fault isolation test system of the multi-branch optical network, which is described above, is capable of performing fault detection only by specifying an optical line having a fault. However, this system is incapable of detecting a distance for a fault point, in other words, this system is incapable of detecting a location of a fault point. In addition, the aforementioned system provides requirement that different distances should be set from the coupler 2 to the filters 41 to 48 respectively. To achieve such a requirement, it is necessary to elongate the length(s) of the optical fiber(s) to some extent. As a result, the aforementioned system may introduce an increase of the cost for constructing the transmission system corresponding to the optical fibers. So, it is difficult to put the aforementioned system to practical use.

SUMMARY OF THE INVENTION

It is an object of the invention to provide a testing device which is capable of detecting a fault line and a fault distance as well as a fault time with respect to a multistage multi-branch optical network.

A testing device of this invention performs testing on a multistage multi-branch optical network, which contains optical lines (such as optical fibers) that are connected together at connection points (e.g., optical couplers) in a multistage multi-branch manner. An OTDR measurement device uses software to perform fault determination with respect to the multistage multi-branch optical network. Herein, optical pulses are input to an input end of the multistage multi-branch optical network, wherein they are reflected at certain portions of the optical lines and the connection points while propagating through the optical lines. Then, reflected beams are returned to the input end and are mixed together as response light, which is measured by the OTDR measurement device. The response light is converted to a plurality of digital waveform data representing a measured waveform, which is then divided into multiple ranges on the basis of the Fresnel reflection points and connection points. Separative analysis is performed on the digital waveform data belonging to each of the ranges of the measured waveform. The separative analysis is repeated at measuring times, which are determined in advance. So, the fault determination is made by comparing results of the separative analysis, which are obtained at the measuring times respectively. By the fault determination, it is possible to determine a fault line and a fault location (or fault distance) as well as a fault time.

For example, the fault determination is made by detecting a positional shift of a spike wave on the measured waveform.

BRIEF DESCRIPTION OF THE DRAWINGS

These and other objects of the subject invention will become more fully apparent as the following description is read in light of the attached drawings wherein:

FIG. 4 shows content of information that is produced in response to measurement results before occurrence of fault;

FIG. 6 shows content of information that is produced in response to measurement results after occurrence of fault;

DESCRIPTION OF THE PREFERRED EMBODIMENT

Figure 1:
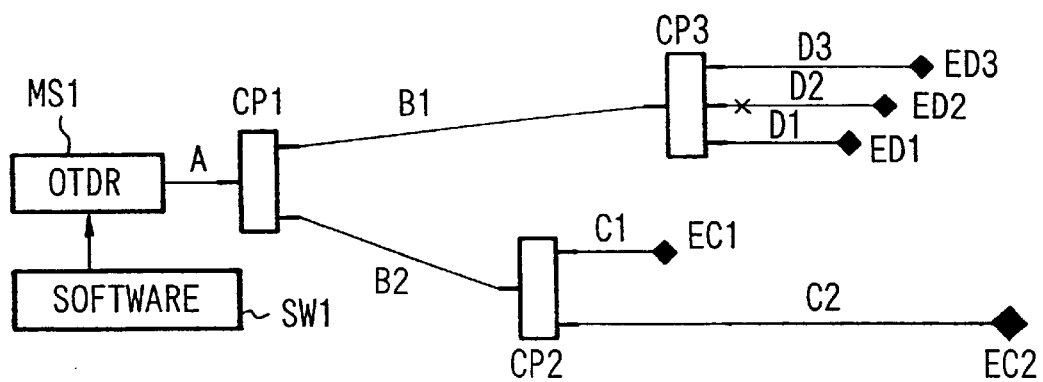
FIG. 1 is a block diagram showing an example of a testing device for a multistage multi-branch optical network in accordance with this invention.

FIG. 1 is a block diagram showing an example of a testing device for a multistage multi-branch optical network in accordance with the preferred embodiment of the invention. In FIG. 1, a reference symbol "MS1" designates an OTDR measurement device, while "SW1" designates a software unit for performing data analysis. In addition, there are provided optical couplers CP1, CP2 and CP3 which act as branch points as well as optical fibers A, B1, B2, C1, C2, D1, D2 and D3, which correspond to optical lines. Herein, the above optical fibers are tested objects on which the testing device of the present example performs testing. Further, reference symbols EC1, EC2, ED1, ED2 and ED3 designate terminal points of the optical fibers C1, C2, D1, D2 and D3 respectively. So, the testing device for the multistage multi-phase optical network in accordance with the present example is connected to the above tested objects via the optical fibers CP1, CP2 and CP3 and is configured by the OTDR measurement device MS1 and the software unit SW1, whose software is executed by the OTDR measurement device 1.

Next, the operation of the present example of the testing device will be described in detail.

When the use of the optical network, corresponding to the aforementioned optical fibers, is started, the testing device of the present example starts to execute processes (1) and (2), which will be described below.

(1) Process that the OTDR measurement device MS1 inputs optical data from each of the optical fibers (A to D3).

In this process, the OTDR measurement device MS1 firstly outputs an optical pulse or optical pulses (i.e., test light). This optical pulse propagates through the optical fiber A, so it is incoming to the optical fiber CP1 wherein it is subjected to branching into two directions. Then, branch beams that are branched in the two directions are respectively incoming to the optical couplers CP3 and CP2 via the optical fibers B1 and B2. The branch beam incoming to the optical coupler CP2 is further branched into two directions. So, further branch beams are incoming to the optical fibers C1 and C2 respectively. On the other hand, the branch beam incoming to the optical coupler CP3 is further branched into three directions, so further branch beams are incoming to the optical fibers D1, D2, and D3 respectively.

As each of the optical pulses are output from the OTDR measurement device 1, it propagates through each of the optical fibers A to D3 respectively. In such a propagation process of the optical pulse, back scattering beams occur. The back scattering beams are transmitted backwardly on the optical fibers C1 to D3 respectively, so they are mixed together by the optical fibers CP2 and CP3 respectively. Then, the mixed back scattering beams are transmitted backwardly on the optical fibers B1 and B2 respectively, so they are further mixed together by the optical coupler CP1 as response light, which is supplied to the OTDR measurement device MS1. The OTDR measurement device MS1 converts the response light to an electric signal (or analog signal) corresponding to a level of the response light. The analog signal is then converted to digital waveform data (or time-series sample data), which are recorded on a memory (not shown).

Figure 2:
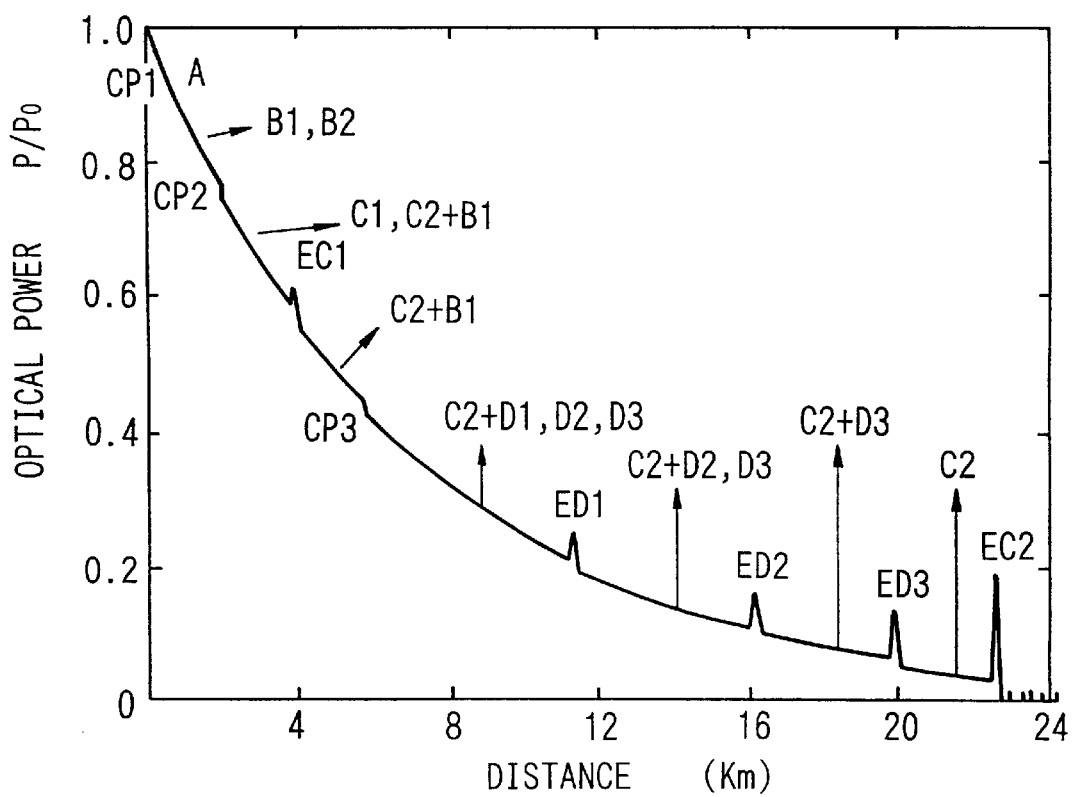
FIG. 2 is a graph showing a response waveform representing response light containing reflection beams and back scattering beams, which are measured by an OTDR measurement device shown in FIG. 1 before occurrence of fault.

FIG. 2 is a characteristic graph showing a waveform of the recorded digital waveform data. In FIG. 2, a horizontal axis represents a distance, which is given by converting lengths of the optical fibers. Each of the digital waveform data is given by the sampling of the intensity of the response light in accordance with a prescribed constant period. Herein, one point for the plotting of the waveform in FIG. 2 corresponds to a unit distance of 2 meter. So, a number of digital waveform data corresponding to 1,000 points are used to represent a response waveform corresponding to reflection beams, which are produced by certain portions of the optical fiber(s) having a length of 20 km, for example. In addition, a vertical axis of FIG. 2 represents a level of the response light which is a mixture of the reflection beams and back scattering beams given from the optical fibers A to D3 respectively.

A spike wave emerges at each of points of the waveform of FIG. 2 which correspond to the terminal points EC1, EC2, ED1, ED2 and ED3 of the optical fibers C1, C2, D1, D2 and D3 respectively. This spike wave is produced based on Fresnel reflection. The terminal point EC1 is located optically in the closest proximity to the OTDR measurement device MS1. So, other terminal points are located with different distances from the OTDR measurement device MS1, wherein locations of them become farther from the device MS1 in an order of ED1, ED2, ED3 and EC2. That is, the terminal point EC2 is located at the farthest place from the device MS1.

(2) Process of waveform analysis

Figure 3:
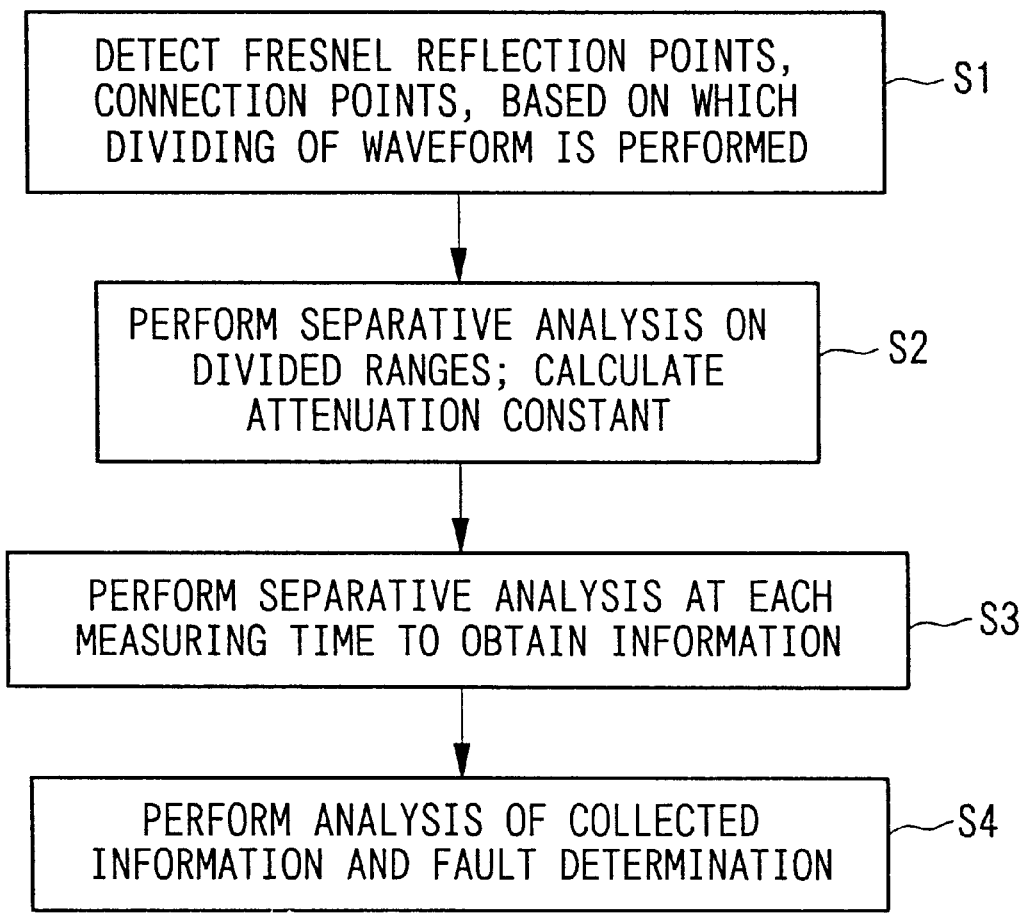
FIG. 3 is a flowchart showing procedures for analysis of digital waveform data, which are produced by the OTDR measurement device based on the response light.

In this process, the testing device of the present example performs analysis of the digital waveform data, which are produced by the aforementioned process (1), in accordance with procedures shown in FIG. 3. FIG. 3 is a flowchart showing procedures for the analysis of the digital waveform data.

The response waveform representing the response light supplied to the OTDR measurement device MS1 is a waveform that is recognized based on the digital waveform data stored in the memory. In step S1, the testing device detects Fresnel reflection points from the response waveform. On the basis of the Fresnel reflection points, the testing device performs a process to divide waveform data representing the response waveform. In this process, for example, inspection is performed with respect to continuity of the digital waveform data. If a difference between levels of adjacent digital waveform data is greater than (or equal to) a prescribed value, the testing device makes a decision that the corresponding point on the response waveform matches with a location corresponding to each of the terminal points EC1, EC2, ED1, ED2 and ED3 of the optical fibers C1, C2, D1, D2 and D3. Or, the testing device makes a decision that the corresponding point matches with a location corresponding to each of the optical couplers CP1, CP2 and CP3, wherein the decision is made based on a variation in level of the response waveform. Based on the aforementioned decision, the testing device divides the waveform data into multiple ranges.

Each of the ranges, which are divided by the aforementioned step S1, defines a range that is sandwiched between Fresnel reflection points. For example, the above range corresponds to a range of distance between the optical couplers CP1 and CP2 or a range of distance between the optical coupler CP2 and the terminal point EC1 of the opticalfiber C1. Instep S2, each of the above ranges is used as an analysis range. Using such an analysis range, a separative analysis is performed with respect to an attenuation constant of each optical fiber. The attenuation constant is given by analysis of an equation that is defined by the optical power and autoregressive constant, for example.

Through the aforementioned processes, it is possible to obtain information as shown in FIG. 4. FIG. 4 shows a table storing an example of the information that is obtained by the aforementioned analysis. Herein, a range of CP3–EC1 corresponds to a range of distance that approximately ranges between 4 km and 6 km, for example. By performing separative analysis of digital waveform data belonging to the above range of CP3–EC1, it is possible to calculate an attenuation rate of the optical fiber C2 as well as an attenuation rate of the optical fiber B1. With respect to the OTDR measurement device MS1, an optical distance lies between an optical location of the terminal point EC1 of the optical fiber C1 and an optical location of the optical coupler CP3. According to results of the aforementioned separative analysis, it is possible to determine that the above optical distance between the optical locations of EC1 and CP3 contains the optical fiber C2 and the optical fiber B1. In other words, it can be understood that a terminal point of the optical fiber C2 is located far from the optical coupler CP3 while a terminal point of the optical fiber B1 is located at the position of the optical coupler CP3. Thus, by performing analysis on each of sections (or ranges) that are separated from each other, it is possible to determine a connection relationship between the optical fibers and optical couplers as shown in FIG. 1 on the basis of the waveform of the digital waveform data as shown in FIG. 2.

By repeating the dividing of the digital waveform data and the separative analysis of the attenuation constant, it is possible to obtain information with regard to the terminal point(s) of each range and the attenuation constant(s) through the separative analysis, which is performed at each of measuring times in step S3. Thus, multiple sets of the information are collected and recorded. In step S4, analysis is performed on the collected information, so that a decision is made as to whether a fault occurs or not.

Figure 5:
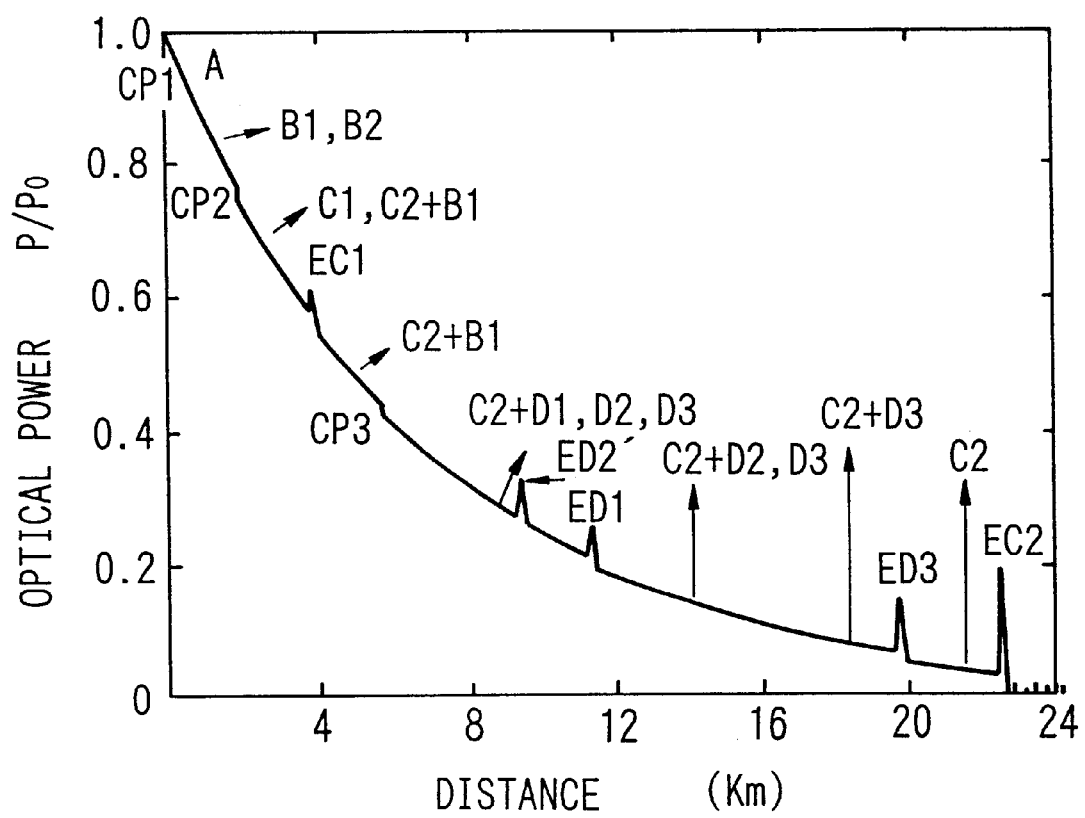
FIG. 5 is a graph showing a response waveform, which is measured by the OTDR measurement device after occurrence of fault.
Figure 7:
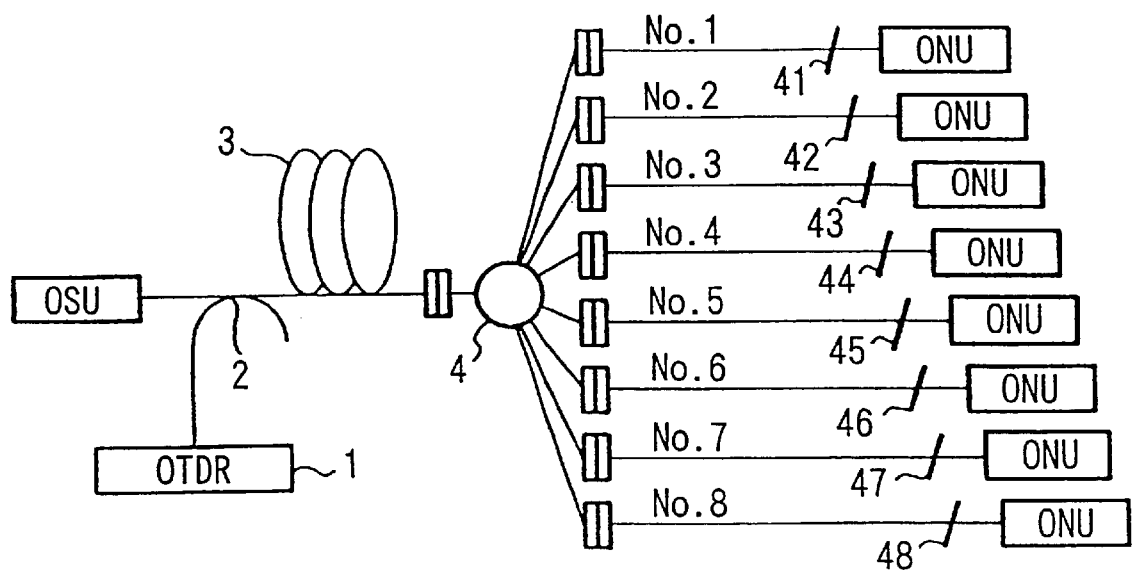
FIG. 7 is a block diagram showing an example of the testing device for the multistage multi-branch optical network.
Figure 8:
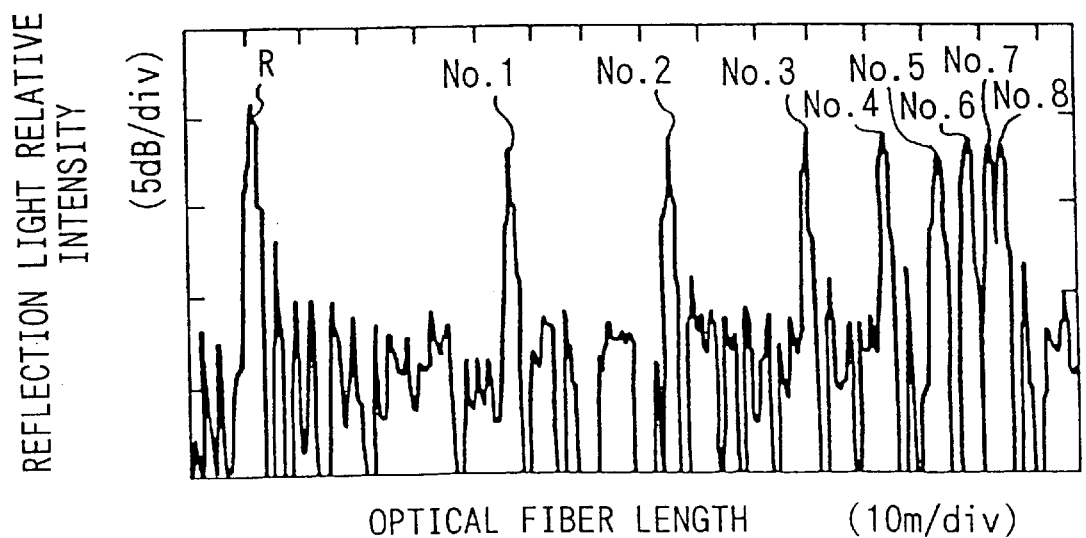
FIG. 8 is a graph showing a waveform representing response light, which is measured by an OTDR measurement device shown in FIG. 7.
Figure 9A:
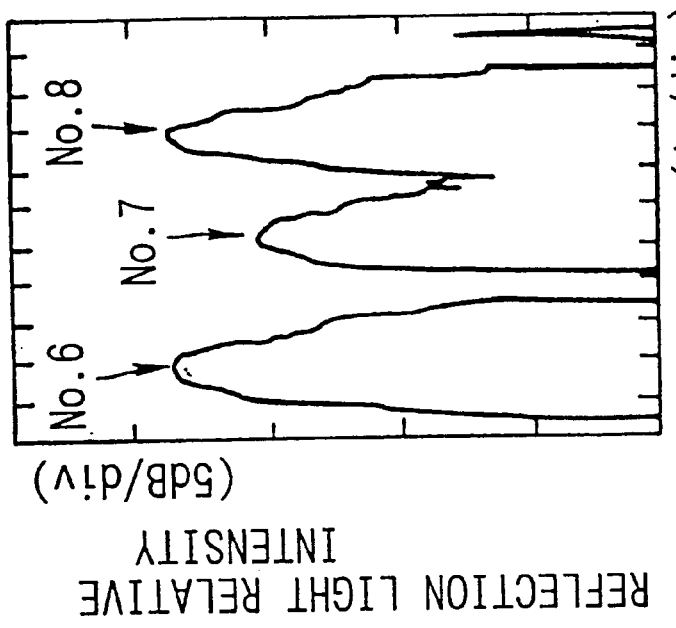
FIG. 9A is a graph showing a magnified portion of the waveform of the response light before occurrence of fault.
Figure 9B:
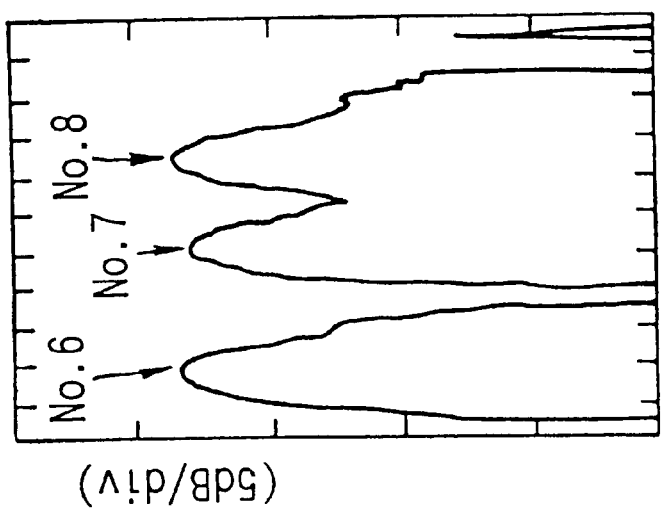
FIG. 9B is a graph showing a magnified portion of the waveform of the response light after occurrence of fault.

Suppose a fault case that a fault point X emerges on the optical fiber D2 in FIG. 1. Herein, the OTDR measurement device MS1 measures a waveform of FIG. 5 at a time "tk+1" which comes after occurrence of fault. So, a Fresnel reflection point emerges at a certain position between the terminal point ED2 of the optical fiber D2 and the optical coupler CP3. FIG. 6 shows divided ranges and results of analysis (e.g., attenuation constants) as well as determination basis for each range with respect to the above fault case. Using the content of information of FIG. 6, it is possible to specify a fault line and a fault distance.

The OTDR measurement device MS1 performs measurement of the waveform at each of prescribed measurement times, which are denoted by t1, t2, . . . , tk, tk+1, tk+2, . . . , for example. As for each of the measurement times, measurement result is recorded, which is described as a record event. With regard to record events that are recorded in connection with the measurement times lying between t1 and tk, there occurs no change in optical power, so it is possible to make a decision that an abnormal state does not exist. With regard to record events that are recorded in connection with the measurement times of tk and tk+1, a change occurs in optical power, so it is possible to make a decision that an abnormal state exists. Based on the time that the abnormal state occurs, it is possible to calculate a fault distance (or fault location) with ease.

As described above, the location of the terminal point ED2 of the optical fiber D2 on the waveform (see FIG. 2), which is measured at the time tk, is shifted to a location of a terminal point ED2' on the waveform (see FIG. 5), which is measured at the time tk+1. So, it can be estimated that a fault occurs in an interval of time between tk and tk+1. In addition, a fault line on which the fault occurs matches with the optical fiber D2 whose terminal point is shifted as described above. Further, a fault distance matches with a shift distance by which the location of the terminal point ED2 at the time tk is shifted to the location of the terminal point ED2' at the time tk+1.

Incidentally, the present example of the testing device is described with respect to the multistage multi-branch optical network, for example. However, the application of this invention is not limited to such a network. So, this invention can be applied to a single-stage multi-branch optical network.

Moreover, the aforementioned software unit SW1 may correspond to recording media (i.e., machine-readable media) such as the floppy disk(s), hard-disk unit and the like, which stores a test program accomplishing the aforementioned processes shown in FIG. 3, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A testing device which introduces optical pulses to a branch point of a multistage multi-branch optical network so that the optical pulses progress in multiple optical lines from the branch point, wherein the optical pulses are reflected by each of portions lying between a near end and a terminal end of each of the optical lines so that at the branch point, reflected optical pulses are mixed to form response light, based on which the testing device measures a characteristic of the multistage multi-branch optical network, said testing device comprising:

conversion means for converting the response light to a plurality of digital waveform data representing intensity versus time;

detection means for detecting Fresnel reflection points and connection points from the plurality of digital waveform data;

dividing means for dividing a measured waveform of the response light into a plurality of ranges on the basis of the Fresnel reflection points and the connection points;

analysis means for performing separative analysis with respect to the digital waveform data involving assignment of range-specific attenuation constants to each of the ranges; and determination means for determining a fault line and a fault distance on the basis of results of the separative analysis.

2. A testing device as defined in claim 1 wherein the analysis means calculates the attenuation constants of the optical lines based on the ranges of the waveform data.

3. A testing device as defined in claim 1 wherein the analysis means repeats separative analysis for the digital waveform data at least two measuring times which are determined in advance, and the determination means compares two sets of measurement information that are results of the separative analysis at the two measuring times respectively, to determine the fault line and fault distance as well as a fault time.

4. A testing method for a multistage multi-branch optical network containing optical lines, which are connected together at connection points in a multistage multi-branch manner, comprising the steps of:

applying optical pulses to an input end of the multistage multi-branch optical network, wherein the optical pulses are reflected at certain portions of the optical lines and the connection points while propagating through the optical lines so that reflected beams are returned to the input end and are mixed together as response light;

measuring the response light in accordance with an OTDR measurement;

converting the response light to a plurality of digital waveform data representing intensity versus time;

detecting Fresnel reflection points and connection points from the plurality of digital waveform data;

dividing the waveform data into a plurality of ranges on the basis of the Fresnel reflection points and the connection points;

repeatedly performing separative analysis of the digital waveform data involving assignment of range-specific attenuation constants to each of the ranges at a plurality of measuring times, which are determined in advance; and performing fault determination by comparing results of the separative analysis, which are obtained at the plurality of measuring times.

5. A testing method as defined in claim 4 wherein the fault determination is made with respect to a fault line and a fault location, which is determined by detecting a positional shift of a spike wave on the measured waveform.

6. A testing method as defined in claim 4 wherein the connection points correspond to optical couplers.

7. A machine-readable media storing a software program that causes a computer equipped with an OTDR measurement device to perform a testing method for a multistage multi-branch optical network containing optical lines, which are connected together at connection points in a multistage multi-branch manner, wherein the testing method comprises:

applying optical pulses to a input end of the multistage multi-branch optical network, wherein the optical pulses are reflected at certain portions of the optical lines while propagating through the optical lines so that reflected beams are returned to the input end and are mixed together as response light;

converting the response light to a plurality of digital waveform data representing intensity versus time;

detecting Fresnel reflection points and connection points from the plurality of digital waveform data;

dividing the waveform data into a plurality of ranges on the basis of the Fresnel reflection points and the connection points;

repeatedly performing separative analysis of the digital waveform data involving assignment of range-specific attenuation constants to each of the ranges at a plurality of measuring times, which are determined in advance; and performing fault determination by comparing results of the separative analysis, which are obtained at the plurality of measuring times.

* * * * *